United States Patent [19]
Yoshida et al.

[11] Patent Number: 6,035,222
[45] Date of Patent: Mar. 7, 2000

[54] EXTENDED COMMON ACCESS CHANNEL LOW POWER USAGE WITHIN THE PERSONAL HANDY PHONE SYSTEM

[75] Inventors: Satoshi Yoshida, Nice; Laurent Winckel, Antibes; Patrick Feyfant, Roulon; Denis Archambaud; Oliver Weigelt, both of Antibes; Phillipe Gaglione, Mandelieu; Varenka Martin, Antibes, all of France

[73] Assignee: VLSI Technology, Inc., San Jose, Calif.

[21] Appl. No.: 09/021,735

[22] Filed: Feb. 11, 1998

[51] Int. Cl.$^7$ .............................. H04B 1/38; H04Q 7/00
[52] U.S. Cl. .......................................... 455/574; 455/511
[58] Field of Search .................................. 455/511, 453, 455/574, 450, 188.1, 866.1

[56] References Cited

U.S. PATENT DOCUMENTS

| | | | |
|---|---|---|---|
| 5,537,100 | 7/1996 | Hallberg | 340/825.21 |
| 5,583,915 | 12/1996 | Ishida | 379/58 |
| 5,787,076 | 7/1998 | Anderson | 370/294 |
| 5,822,313 | 10/1998 | Malek | 370/332 |
| 5,949,764 | 9/1999 | Yoshida | 370/263 |

OTHER PUBLICATIONS

Association of Radio Industries and Businesses (ARIB), Personal Handy Phone System ARIB Standard, Version 2, Dec. 26, 1995.

Ministry of Posts and Telecommunications, Consulting Company, PHS services Providers, Manufactures, "Personal Handy–Phone System (PHS) Guidebook" Jul. 1995, Ministry of Posts & Telecommunications, Japan.

*Primary Examiner*—Paul Loomis
*Assistant Examiner*—Nick Corsaro
*Attorney, Agent, or Firm*—Wagner, Murabito & Hao LLP

[57] ABSTRACT

A method and system that enables a portable station within the personal handy phone system (PHS) to utilize the preamble field of the communication interface to contain extended common access channel field information while optimizing power consumption. The present invention can operate within a cell station of the PHS. The present invention empowers a portable station to identify the type of data contained within the preamble field. A predetermined number of data bits are extracted from the beginning of the preamble field of an incoming data frame received by a portable station. The present invention determines if the extracted data bits are identical to a predetermined data bit pattern. If the extracted data bits are identical to the data bit pattern, the portable station is directed to treat the data contained within the preamble field as the standardized preamble of the PHS by not storing it within memory and not performing a cyclic redundancy check (CRC) on it. If the data bits are not identical to the data bit pattern, the portable station treats the data contained within the preamble field as extended common access channel data by storing it within memory and performing a CRC on it. By enabling a portable station to identify the data within the preamble field, data storage and CRC are not performed on preamble data resulting in conservation of portable station power. Optimizing power consumption within a portable station is critical because it operates under limited battery power.

21 Claims, 9 Drawing Sheets

EXTENDED COMMON ACCESS CHANNEL LOW POWER USAGE WITHIN THE PERSONAL HANDY PHONE SYSTEM

TECHNICAL FIELD

The present invention relates to the field of wireless telecommunications. More specifically, the present invention relates to enabling a portable station and/or a cell station within the personal handy phone system to utilize the preamble field of the communication interface to contain extended common access channel field information while optimizing power consumption.

BACKGROUND ART

Within the field of wireless telecommunications systems there exists a system referred to as the personal handy phone system, otherwise known as PHS. Within the personal handy phone system a user of a portable or personal station (PS) is able to communicate with a user of another telecommunication device by way of a cell station (CS). A portable station and a cell station of the personal handy phone system communicate by way of a wireless digital radio interface that utilizes communication frames and slots.

When a portable station receives transmitted data from a cell station, the data contained within the preamble field of the received communication slot is used by the portable station hardware for clock recovery from the data stream. Once the portable station is synchronized with the cell station, the data contained within the preamble field is generally not needed during the remainder of the communication session between the portable station and the cell station. The personal handy phone system standard does not define the format or usage of the preamble field once it has been utilized for its intended purpose by the portable station and the cell station. Instead, the data within the neglected preamble field is left to the user to define. Within the prior art, the neglected preamble field has been used to contain extended common access channel field information.

By containing extended common access channel field data within the neglected preamble field, the bandwidth of the common access channel field is increased for some channels, e.g., the user specific control channel (USCCH) and the user specific packet channel (USPCH). Moreover, some network service providers use the common access channel (CAC) field and the extended common access channel field data contained within the neglected preamble field for specific services. If the preamble field is utilized for containing extended common access channel data, it is important to determine whether the extended common access channel data within that field is free of errors once it is received by a portable station.

The prior art procedure to determine if the extended common access channel data within the preamble field is free of errors after reception involves storing it within the portable station memory and performing a cyclic redundancy check (CRC) on it. Unfortunately, there is a problem associated with this prior art procedure. Today, the personal handy phone system does not differentiate preamble data from extended common access channel data until much of the data is received. As a result of not being able to identify the data, the prior art procedure processes (e.g., data storage and perform cyclic redundancy check) any data contained within the preamble field. The problem associated with the prior art procedure is that processing preamble data is useless in most cases, resulting in needless consumption of portable station power. Optimizing power consumption within a portable station is very critical because it operates under the limited power of an internal battery.

Therefore, it would be advantageous to provide a method and system that enables a portable station within the personal handy phone system to utilize the preamble field of the communication interface to contain extended common access channel field information while optimizing power consumption. The present invention provides this advantage.

DISCLOSURE OF THE INVENTION

The present invention includes a method and system that enables a portable station and/or a cell station within the personal handy phone system to utilize the preamble field of the communication interface to contain extended common access channel field information while optimizing power consumption. Since optimizing power consumption within a portable station is very critical, the following discussion about the present invention focuses on its implementation within a portable station. It is understood that the present invention operates equally well within a cell station of the personal handy phone system.

The present invention enables a portable station to utilize the preamble field of the communication interface to contain extended common access channel field information while optimizing power consumption by empowering it to determine the type of data contained within the preamble field. Specifically, the present invention extracts a predetermined number of data bits from the beginning of the preamble field of an incoming data frame received by a portable station. One present invention embodiment extracts 16 bits of data from the beginning of the preamble field of an incoming date frame. The present invention enables the portable station to determine if the extracted data bits are identical to a predetermined data bit pattern. One present invention embodiment of the predetermined data bit pattern is the first 16 data bits of the beginning of the standardized preamble data bit pattern utilized within the personal handy phone system.

If the extracted data bits are identical to the predetermined data bit pattern, the portable station is directed to treat the data contained within the preamble field as the standardized preamble of the personal handy phone system. So if the portable station is unsynchronized with the transmitting cell station, the portable station is directed to use the preamble data for clock recovery enabling it to synchronize its hardware with the hardware of the transmitting cell station. If the portable station is already synchronized with the transmitting cell station, the portable station is directed to ignore the preamble data by not storing it and by not performing a cyclic redundancy check on it, thereby saving the power of the portable station.

If the data bits extracted by an embodiment of the present invention portable station are not identical to the predetermined data bit pattern, the portable station is directed to treat the data contained within the preamble field as extended common access channel data. The present invention portable station stores the extended common access channel data within its memory and then performs a cyclic redundancy check on the stored data. A cyclic redundancy check is performed to verify that the received extended common access channel data is error free.

By enabling a portable station to identify (early) the type of data that is contained within the preamble field of the communication interface and ignoring useless data, the portable station does not perform data storage and cyclic redundancy checks on preamble data which results in unnecessary consumption of portable station power. Optimizing power consumption within a portable station is very critical because it operates under the limited power of an internal battery.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a method and system for enabling a portable station and/or a cell station within the personal handy phone system to utilize the preamble field of the communication interface to contain extended common access channel field information while optimizing power consumption, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention operates within the personal handy phone system which provides its users wireless voice communication. Along with providing its users wireless voice communication, the personal handy phone system also provides facsimile (fax) and multimedia communication capabilities. The personal handy phone system has the ability to operate both indoors and outdoors, offering greater communication opportunities. For instance, the indoor operations include using it within office spaces, homes, hotels, shopping malls and airports. Furthermore, the outdoor operations of the personal handy phone system include using it within rural, suburban, and city areas. The personal handy phone system is well known by those skilled in the art, and is discussed in a number of publications, such as Personal Handy-Phone System (PHS) Guidebook by the Ministry of Posts & Telecommunications, Japan (1995) and Personal Handy Phone System ARIB Standard Version 2 by the Association of Radio Industries and Businesses, (1995).

Figure 1:
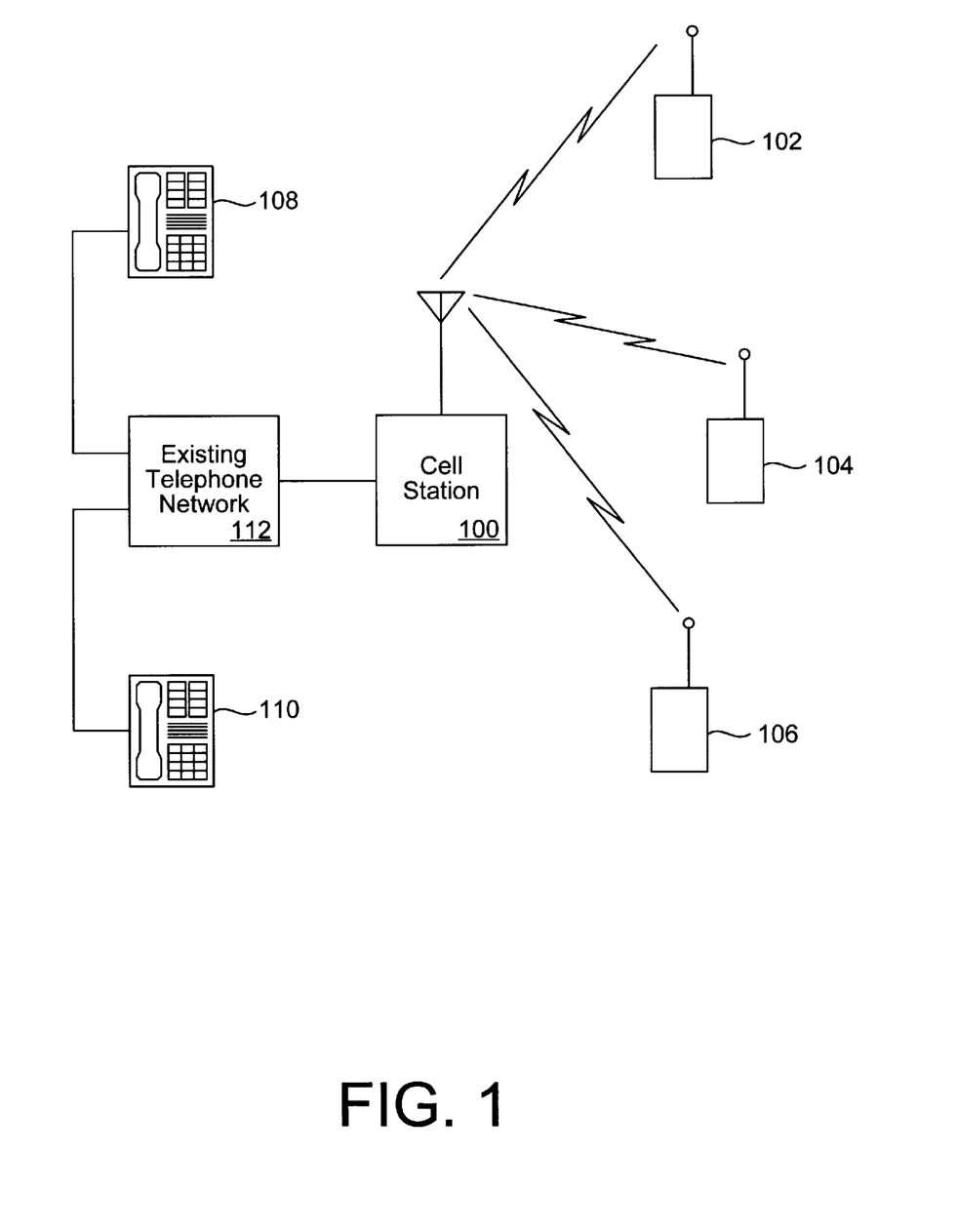
FIG. 1 illustrates a general overview of the personal handy phone system in which the present invention operates.

FIG. 1 illustrates a general overview of the personal handy phone system 50 in which the present invention operates. The two main components that comprise the personal handy phone system are a cell station (CS) 100 and a personal or portable station (PS) 102. When the present invention is implemented within the personal handy phone system 50, it can reside within a portable station 102 and/or a cell station 100. Since optimizing power consumption within a portable station 102 is very critical, the following detailed discussion about the present invention focuses on its implementation within portable station 102. It is understood that the present invention operates equally well within cell station 100 of the personal handy phone system 50.

Referring to FIG. 1, portable stations 102–106 are similar in function to cordless telephone handsets and have the ability to transmit and receive voice information along with other types of data. Cell station 100 is a transmitter and receiver base station which can be implemented by coupling it into the existing public telephone network 112. Implemented in this way, cell station 100 enables the users of portable stations 102–106 to communicate with each other and with the users of telephones 108 and 110, which are coupled by wire to the existing public telephone network 112. The information that is communicated between cell station 100 and portable stations 102–106 is the same type of information that can normally be transferred and received over a public telephone wire network system (e.g., voice/data etc.). Instead of communicating over a wire network, the personal handy phone system uses a wireless digital radio interface to communicate information between cell station 100 and portable stations 102–106. One embodiment of the digital radio interface used by the personal handy phone system 50 is a time division multiple access capability with time division duplexing (TDMA-TDD).

Figure 2:
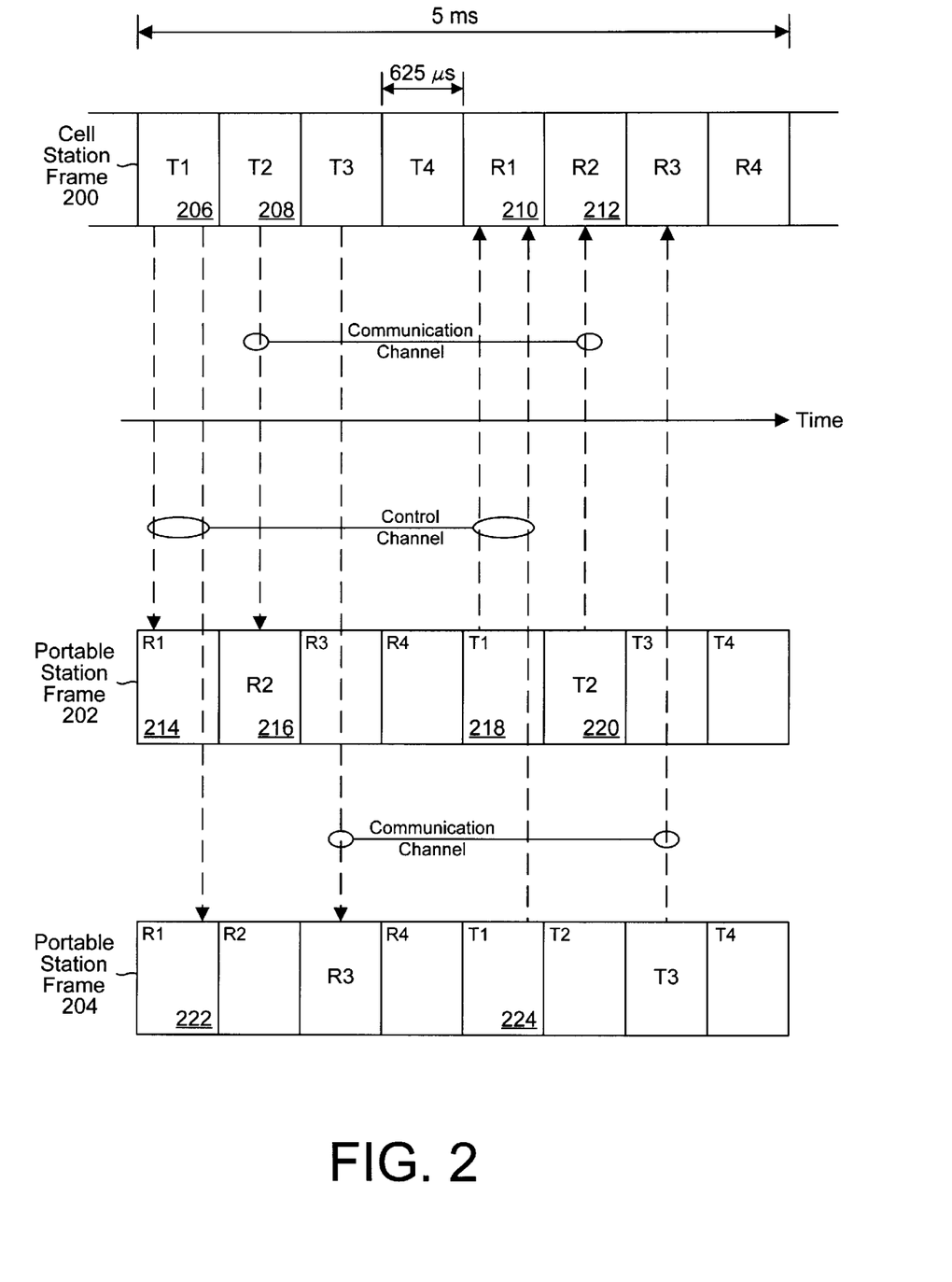
FIG. 2 illustrates one embodiment of a time division duplexed communication frame used within the personal handy phone system as a digital radio interface between cell stations and portable stations.

FIG. 2 illustrates time division duplexed frames 200–204, which are used within the personal handy phone system 50 of FIG. 1 as the digital radio interface between cell station 100 and multiple portable stations 102–104. Frames 200–204 each have a time interval of 5 milliseconds which is divided into eight communication slots, four slots for receiving data (R1, R2, R3, R4) and four slots for transmitting data (T1, T2, T3, T4). Each communication slot within frames 200–204 has a time interval of 625 microseconds. When cell station 100 is simultaneously communicating with portable stations 102 and 104, one transmitting slot and one receiving slot within each one of frames 200–204 are reserved to establish a control channel for cell station 100. For instance, transmitting slots 206, 214 and 222 of frames 200–204, respectively, are reserved to establish part of the control channel. Furthermore, receiving slots 210, 218 and 224 of frames 200–204, respectively, are also reserved to establish part of the control channel. The superframe structure of the personal handy phone system enables all cell stations to share the same control channel. The personal handy phone system standard does not specify which slots are to be used as the control channel, but within Japan the first and forth slots within a frame are reserved to establish the control channel.

During a communication session between cell station 100 of FIG. 1 and portable station 102, data transmitted by cell station 100 to portable station 102 during slot 208 of FIG. 2, which is the second transmitting slot of frame 200, is received within slot 216, which is the second receiving slot of frame 202. When data is transmitted by portable station 102 to cell station 100 during slot 220, which is the second transmitting slot of frame 202, it is received within slot 212, which is the second receiving slot of frame 200. In this manner, an independent communication channel is established between cell station 100 and portable station 102 for the duration of the communication session. Similarly, cell station 100 and portable station 104 have established an independent communication channel by utilizing the third transmitting slot and the third receiving slot of frames 200 and 204. Therefore, cell station frame 200 allows up to four logical channels of simultaneous communication, e.g., between a cell station and four portable stations.

Within the personal handy phone system 50 of FIG. 1 there are two types of data formats that can be implemented within the communication slots of frames 200–204 illustrated in FIG. 2. One type of data format that can be implemented within the communication slots is referred to as the communication physical slot data format. The present invention does not utilize the communication slots of FIG. 2 when they are implemented with the communication physical slot data format. The other type of data format that can be implemented within the communication slots is referred to as the control physical slot data format. The present invention only utilizes the communication slots of FIG. 2 when they are implemented with the control physical slot data format.

Figure 3A:
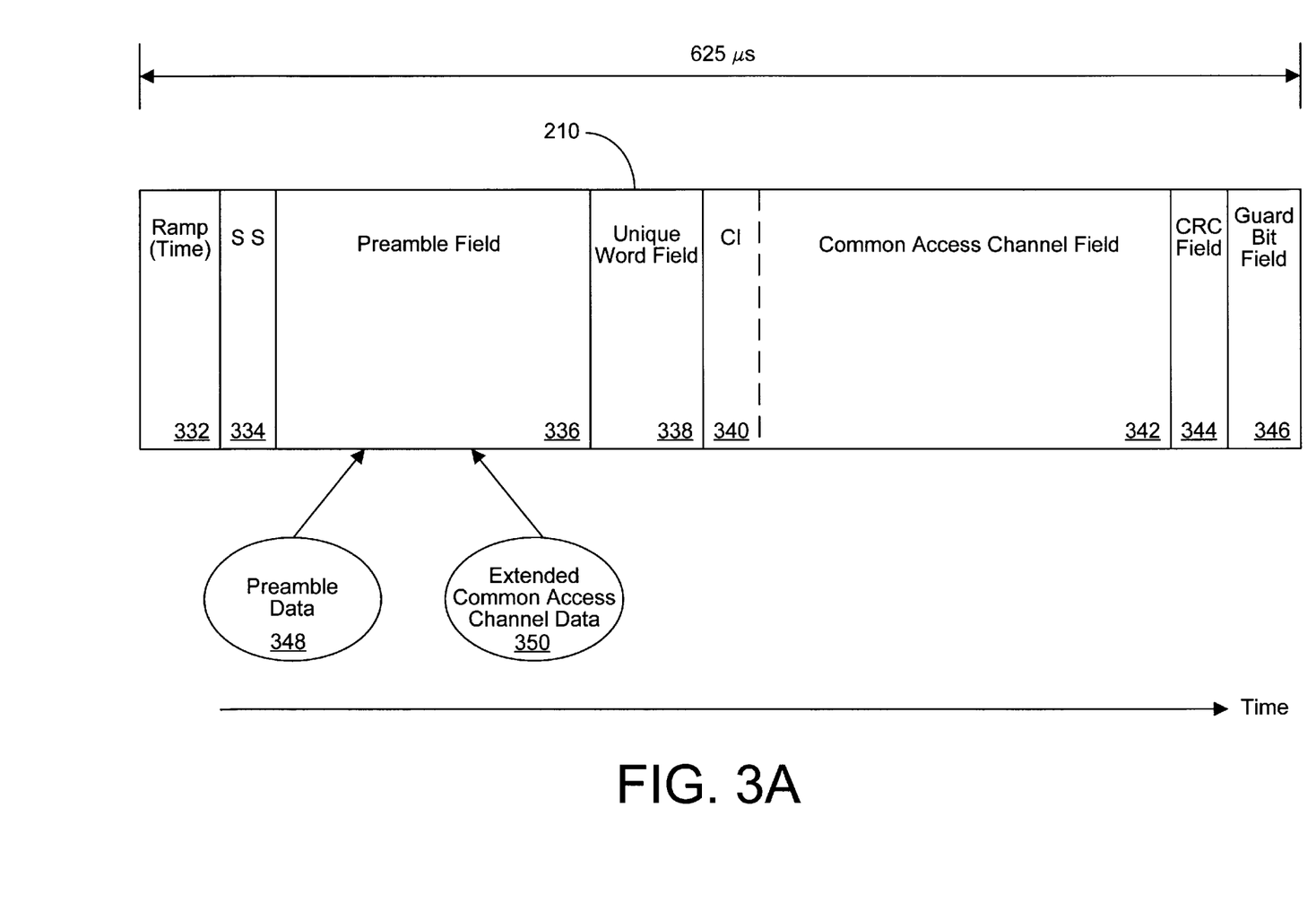
FIG. 3A illustrates a communication slot of FIG. 2 implemented with the control physical slot data format.

FIG. 3A illustrates communication slot 210 of FIG. 2 implemented with the control physical slot data format. In one embodiment of the present invention, communication slot 210 has a time interval of 625 microseconds ($\mu$s) and contains 240 bits of data and is transmitted by the cell station 100 of FIG. 1. The order in which the different fields (332, 334, 336, 338, 340, 342, 344, 346) located within slot 210 are received by the hardware within portable station 102 of FIG. 1 occurs from left to right. The ramp (time) field 332 is used as a buffer for slot 210 and contains 4 bits of data. The start symbol (SS) field 334 indicates the beginning of slot 210 and it contains 2 bits of data.

The unique word field 338 of FIG. 3A contains 32 bits of data and is used to synchronize portable station 102 of FIG. 1 with cell station 100. The common access channel (CAC) field 342 contains 108 bits of data and is the main communication field of slot 210, which can include different types of protocol, e.g., user specific control channel, user specific packet channel, and signaling control channel. The channel identifier (CI) field 340 is a sub-field that is contained within the common access channel field 342. The channel identifier field 340 contains 4 bits of data that indicate the particular channel type of communication slot 210, e.g., user specific control channel (USCCH), user specific packet channel (USPCH), signaling control channel (SCCH), broadcast control channel (BCCH), traffic channel (TCH) or paging channel (PCH). The cyclic redundancy check (CRC) field 344 contains 16 bits of data and is used to verify that the data contained within the common access channel field 342 is free of errors. The guard bit field 346 contains 16 bits of data and is used as a buffer space for slot 210.

Preamble field 336 of FIG. 3A contains 62 bits of data and is the field that is utilized by the present invention. Preamble field 336 can either contain preamble data 348 or extended common access channel data 350. Each type of data contained within preamble field 336 is used for a separate purpose by portable station 102 of FIG. 1. For instance, within the personal handy phone system, preamble data 348 is a predictable standardized fixed 62 data bit pattern. When cell station 100 and portable station 102 first begin communicating, preamble field 336 contains preamble data 348 which is used by portable station 102 for clock recovery enabling its hardware to synchronize with the hardware of cell station 100.

Once portable station 102 of FIG. 1 and cell station 100 are synchronized, preamble field 336 is used by an embodiment of the present invention to contain extended common access channel data 350. When extended common access channel data 350 is contained within preamble field 336, the bandwidth of the common access channel field 342 is increased for some channels, e.g., the user specific control channel (USCCH) and the user specific packet channel (USPCH). Moreover, some personal handy phone system network service providers use the data contained within common access channel field 342 and the extended common access channel data 350 contained within preamble field 336 for specific services. When extended common access channel data 350 is contained within preamble field 336, it is important to verify that it is error free. Portable station 102 performs this verification by storing the extended common access channel data 350 within memory and performing a cyclic redundancy check on it. Since it is a waste of power for portable station 102 to process (e.g., data storage and cyclic redundancy check) preamble data 348 contained within preamble field 336 the same way it processes extended common access channel data 350, the present invention enables portable station 102 to determine what type of data is contained within preamble field 336.

Figure 3B:
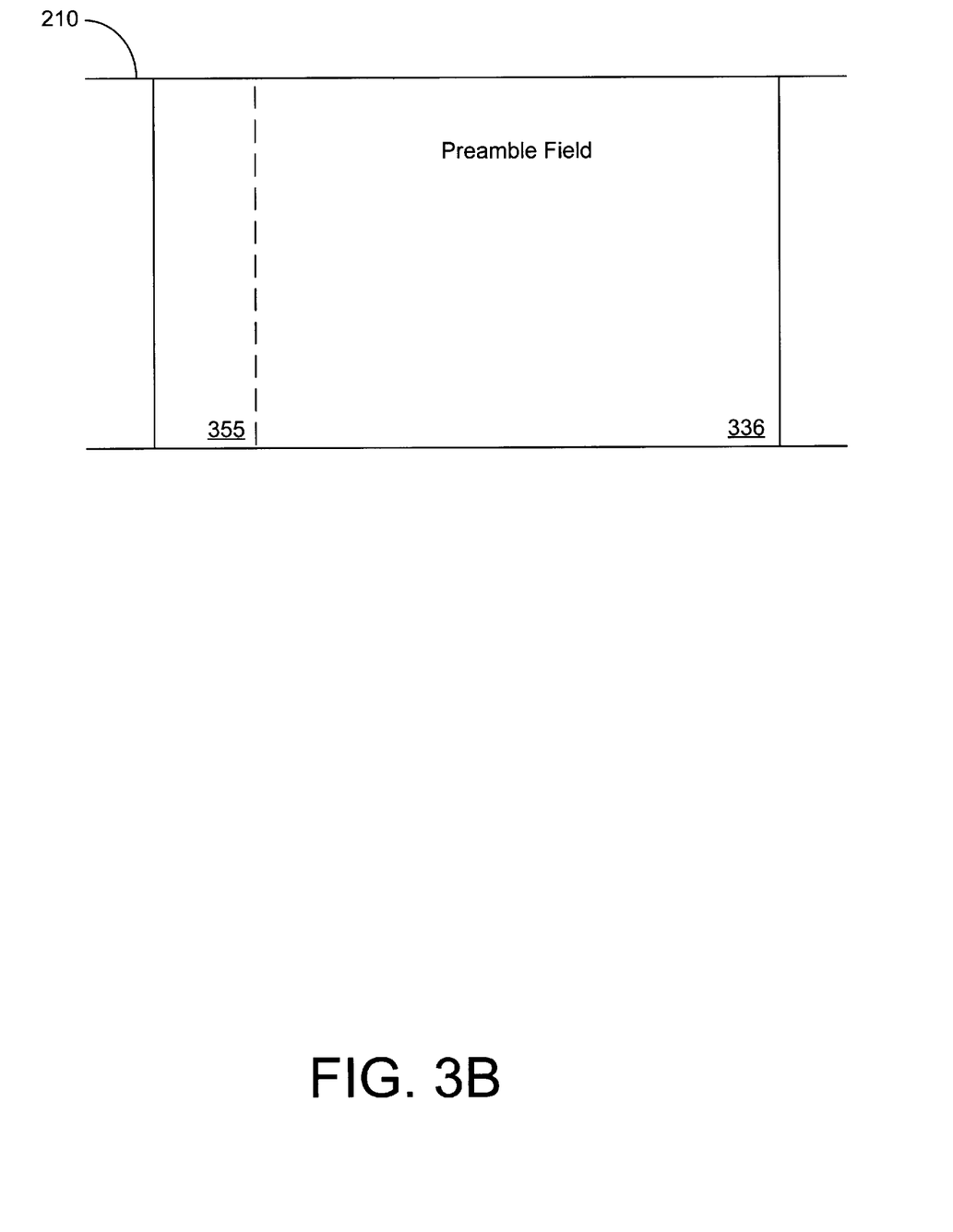
FIG. 3B illustrates an embodiment of the preamble field of FIG. 3A within the present invention.

FIG. 3B illustrates an embodiment of preamble field 336 of FIG. 3A within the present invention. One embodiment of the present invention inserts a 16 data bit field 355 at the beginning of the preamble field 336 to determine whether the data contained within preamble field 336 is preamble data 348 or extended common access channel data 350. Specifically, the present invention portable station 102 of FIG. 1 determines whether the first 16 bits of data of preamble field 336 are identical to the predictable data pattern of the first 16 data bits of the standardized preamble data 348 of the personal handy phone system. If the first 16 data bits of preamble field 336 are not identical to the first 16 data bits of the preamble data 348, the present invention portable station 102 stores within its memory the extended common access channel data 350 contained within preamble field 336 and performs a cyclic redundancy check on it. If the first 16 data bits of preamble field 336 are identical to the first 16 data bits of the preamble data 348, the present invention portable station 102 treats the data contained within preamble field 336 as preamble data 348. Since the present invention portable station 102 neither stores nor performs a cyclic redundancy check on preamble data 348, the power of portable station 102 is conserved.

Figure 4:
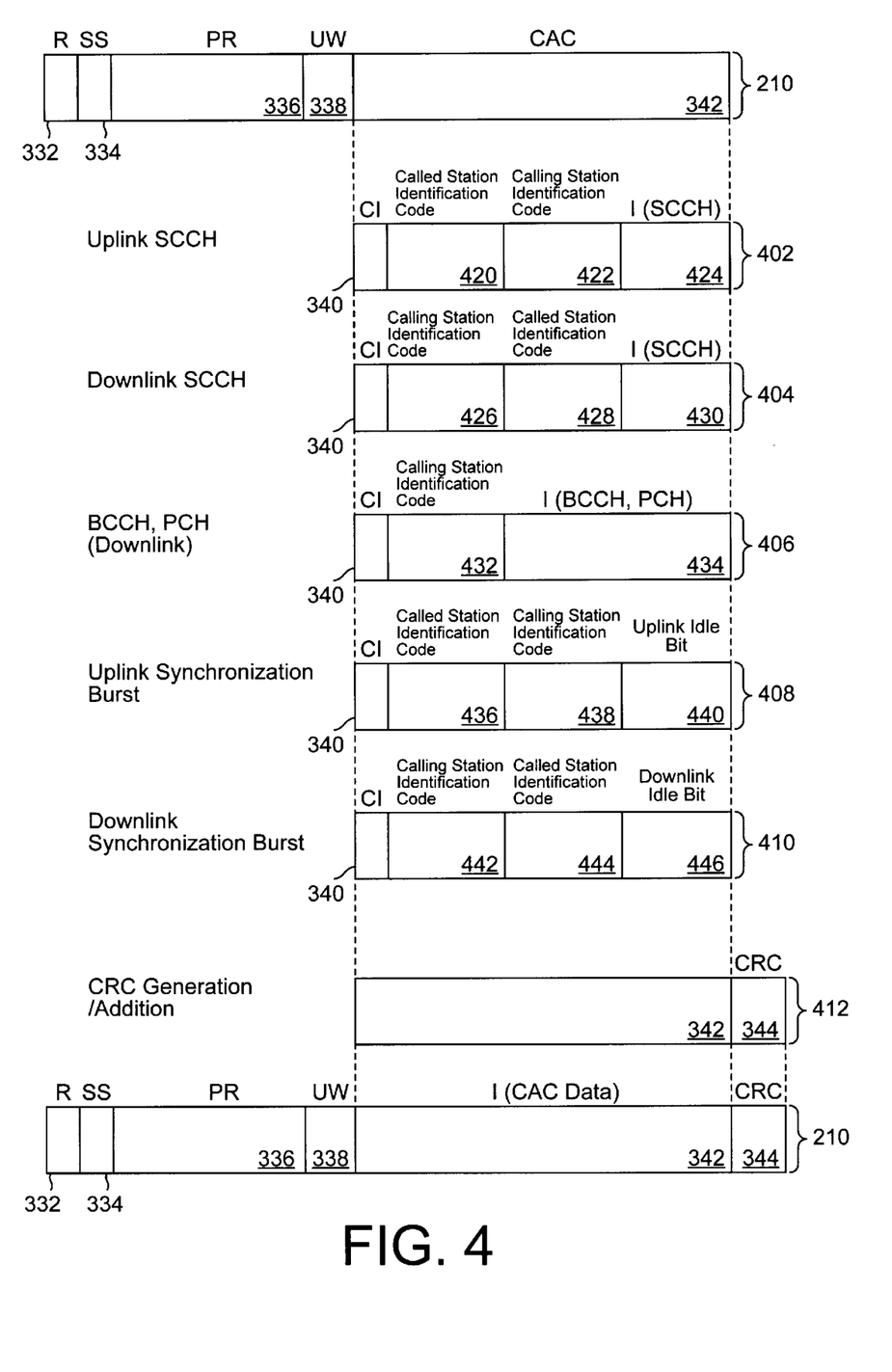
FIG. 4 illustrates several channel coding formats that can be used within an embodiment of the present invention while preamble data is contained within the preamble field of the communication slot of FIG. 3A.

FIG. 4 illustrates several channel coding formats that can be used within an embodiment of the present invention while preamble (PR) data 348 of FIG. 3A is contained within preamble field 336 of communication slot 210. Channel coding format 402 is used for an uplink signaling control channel (SCCH). The channel identifier (CI) field 340 contains 4 bits of data, while the called station identification code field 420 contains 42 data bits. Furthermore, the calling station identification code field 422 contains 28 bits of data, while the I (SCCH) field 424 contains 34 data bits. Channel coding format 404 is used for a downlink signal control channel, where calling station identification code field 426 contains 42 data bits. Furthermore, the called station identification code field 428 contains 28 data bits, while the I (SCCH) field 430 contains 34 data bits. Channel coding format 406 is used for downlink communication for a broadcast control channel (BCCH) and a paging channel (PCH). The calling station identification code 432 contains 42 bits of data, while the I (BCCH, PCH) field 434 contains 62 bits of data.

Channel coding format 408 of FIG. 4 is used for uplink synchronization burst, where the called station identification code field 436 contains 42 bits of data. Furthermore, the calling station identification code field 438 contains 28 data bits, while the uplink idle bit field 440 contains 34 bits of data. Channel coding format 410 is used for downlink synchronization burst, where the calling station identification code field 442 contains 42 data bits. Furthermore, the called station identification code field 444 contains 28 data bits, while the downlink idle bit field 446 contains 34 data bits. Channel coding format 412 is used for cyclic redundancy check (CRC) generation and addition, where common access channel field 342 contains 108 bits of data.

Figure 5:
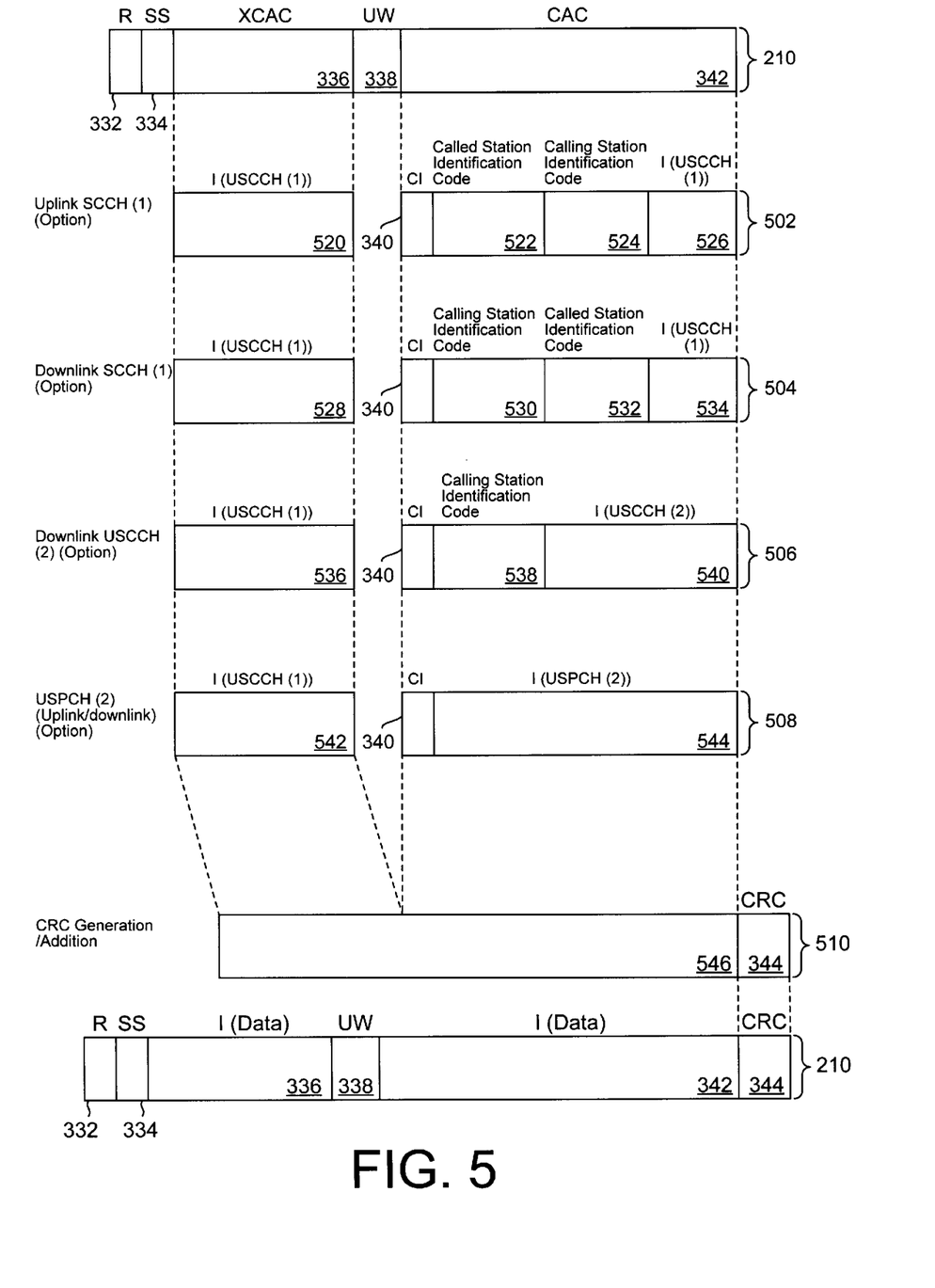
FIG. 5 illustrates several channel coding formats that can be used within an embodiment of the present invention while extended common access channel data is contained within the preamble field of the communication slot of FIG. 3A.

FIG. 5 illustrates several channel coding formats that can be used within an embodiment of the present invention while extended common access channel (XCAC) data 350 of FIG. 3A is contained within preamble field 336 of communication slot 210. Channel coding format 502 is used for an uplink signaling control channel (SCCH) (1) option, where the I (user specific control channel (USCCH) (1)) field 520 contains 62 bits of data. The channel identifier (CI) field 340 contains 4 bits of data, while the called station identification code field 522 contains 42 data bits. Furthermore, the calling station identification code field 524 contains 28 bits of data, while the I (USCCH (1)) field 526 contains 34 data bits. Channel coding format 504 is used for a downlink signal control channel (SCCH) (1) option. The I (USCCH (1)) field 528 contains 62 data bits, while the calling station identification code field 530 contains 42 bits of data. Furthermore, the called station identification code field 532 contains 28 data bits, while the I (USCCH (1)) field 534 contains 34 data bits.

Channel coding format 506 of FIG. 5 is used for a downlink user specific control channel (USCCH) (2) option, where the I (USCCH (2)) field 536 contains 62 bits of data. The calling station identification code field 538 contains 42 data bits, while the I (USCCH (2)) field 540 contains 62 data bits. Channel coding format 508 is used for an user specific packet channel (USPCH) (2) uplink and downlink option. The I (USPCH (2)) field 542 contains 62 bits of data while the I (USPCH (2)) field 544 contains 104 data bits. Channel coding format 510 is used for cyclic redundancy check (CRC) generation and addition, where field 546 contains 170 bits of data, but the scope of the cyclic redundancy check execution is optional.

Figure 6A:
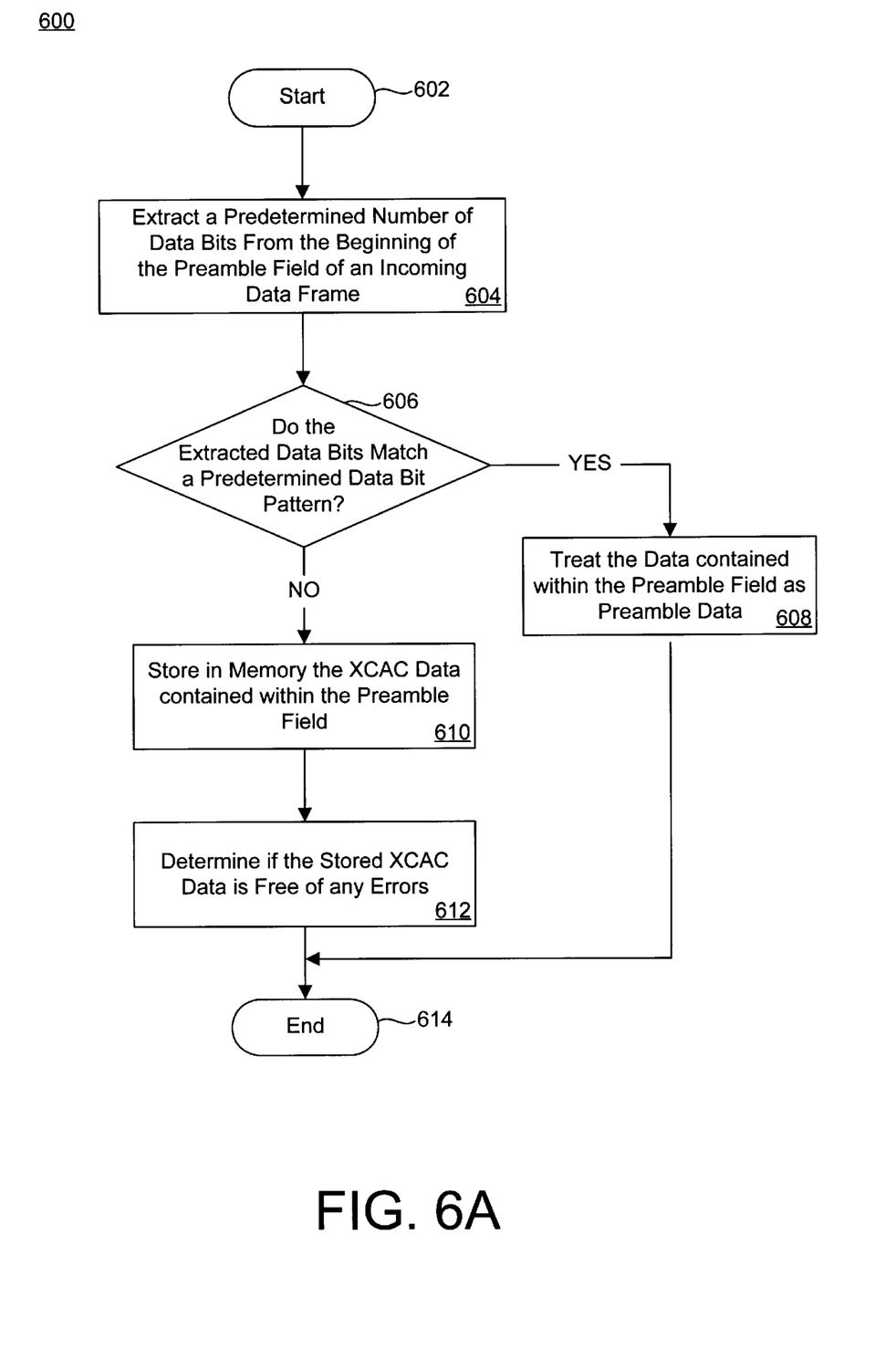
FIG. 6A shows a flowchart of one embodiment of the present invention for enabling a portable station to utilize the preamble field of the communication interface to contain extended common access channel field data while optimizing power consumption.
Figure 6B:
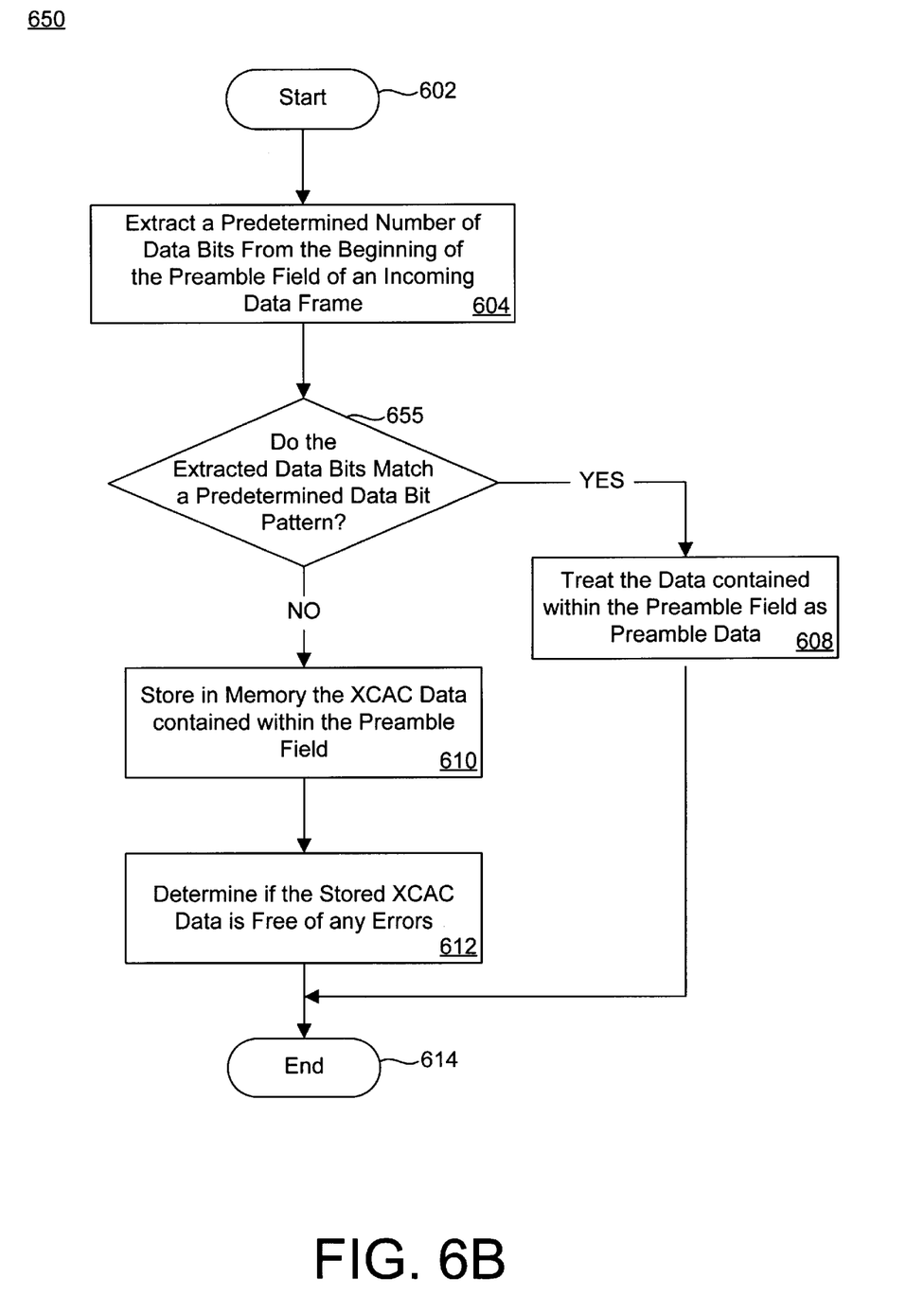
FIG. 6B shows a flowchart of another embodiment of the present invention for enabling a portable station to utilize the preamble field of the communication interface to contain extended common access channel field data while optimizing power consumption.

FIGS. 6A and 6B each show a flowchart of an embodiment of the present invention. The present invention embodiment shown within FIG. 6A determines whether preamble data 348 of FIG. 3A is contained within preamble field 336. The present invention embodiment shown within FIG. 6B determines whether extended common access channel field data 350 is contained within preamble field 336.

FIG. 6A shows a flowchart of a method 600 of the present invention for enabling portable station 102 of FIG. 1 to utilize the preamble field 336 of FIG. 3A to contain extended common access channel field information 350 while optimizing power consumption. Process 600 is performed by portable station 102 for each communication slot received by portable station 102. FIG. 6A contains process 600 which starts at step 602. Step 604 directs portable station 102 to extract a predetermined number of data bits from the beginning of preamble field 336 of FIG. 3B, located within sub-field 355, from an incoming data frame which was transmitted by cell station 100. Within one embodiment of the present invention, portable station 102 extracts the first 16 bits of data from the preamble 336 of an incoming data frame.

Once step 604 is complete, step 606 of FIG. 6A directs portable station 102 of FIG. 1 to determine if the data bits extracted during step 604 are identical to a predetermined data bit pattern stored within portable station 102. Within one embodiment of the present invention, the predetermined data bit pattern is the first 16 data bits of the standardized preamble of the personal handy phone system. The predetermined data bit pattern of step 604 is used to identify the data contained within preamble field 336 as valid preamble data 348 of FIG. 3A. At step 606, if the extracted data bits are identical to the predetermined data bit pattern, portable station 102 is directed to proceed to step 608. Step 608 directs portable station 102 to treat the data contained within preamble field 336 as preamble data 348. Importantly, at step 608 neither data storage nor a cyclic redundancy check are performed on the preamble data 348, which conserves the power of portable station 102. Step 614 directs portable station 102 to exit process 600.

At step 606 of FIG. 6A, if the extracted data bits are not identical to the predetermined data bit pattern, portable station 102 of FIG. 1 is directed to proceed to step 610. Step 610 directs portable station 102 to treat the data contained within preamble field 336 of FIG. 3A as extended common access channel field (XCAC) data 350 by storing it within the memory of portable station 102. Step 612 directs portable station 102 to determine if the extended common access channel data 350, which is linked with the data contained within the common access channel field 342, is free of any errors. Within one embodiment of the present invention, portable station 102 performs a cyclic redundancy check on the stored extended common access channel data 350 to verify that it is free of any errors. Step 614 directs portable station 102 to exit process 600.

FIG. 6B shows a flowchart of a method 650 of the present invention for enabling portable station 102 of FIG. 1 to utilize the preamble field 336 of FIG. 3A to contain extended common access channel field information 350 while optimizing power consumption. Process 650 is performed by portable station 102 for each communication slot received by portable station 102. All the steps of process 650 are the same as described above for process 600 of FIG. 6A, except step 655 of process 650 replaces step 606 of process 600. FIG. 6B contains process 650 which starts at step 602. Step 604 directs portable station 102 to extract a predetermined number of data bits from the beginning of preamble field 336 of FIG. 3B, located within sub-field 355, from an incoming data frame which was transmitted by cell station 100. Within one embodiment of the present invention, portable station 102 extracts the first 16 bits of data from preamble field 336 of an incoming data frame transmitted by cell station 100.

Once step 604 is complete, step 655 of FIG. 6B directs portable station 102 of FIG. 1 to determine if the data bits extracted during step 604 are identical to a predetermined data bit pattern stored within portable station 102. Within one embodiment of the present invention, the predetermined data bit pattern contains 16 data bits. The predetermined data bit pattern of step 655 is used to identify the data contained within preamble field 336 as valid extended common access channel data 350 of FIG. 3A. At step 655, if the extracted data bits are identical to the predetermined data bit pattern, portable station 102 is directed to step 610. At step 655, if the extracted data bits are not identical to the predetermined data bit pattern, portable station 102 is directed to step 608. The remaining steps of process 650 are exactly the same as the steps described above for process 600 of FIG. 6A.

Figure 7:
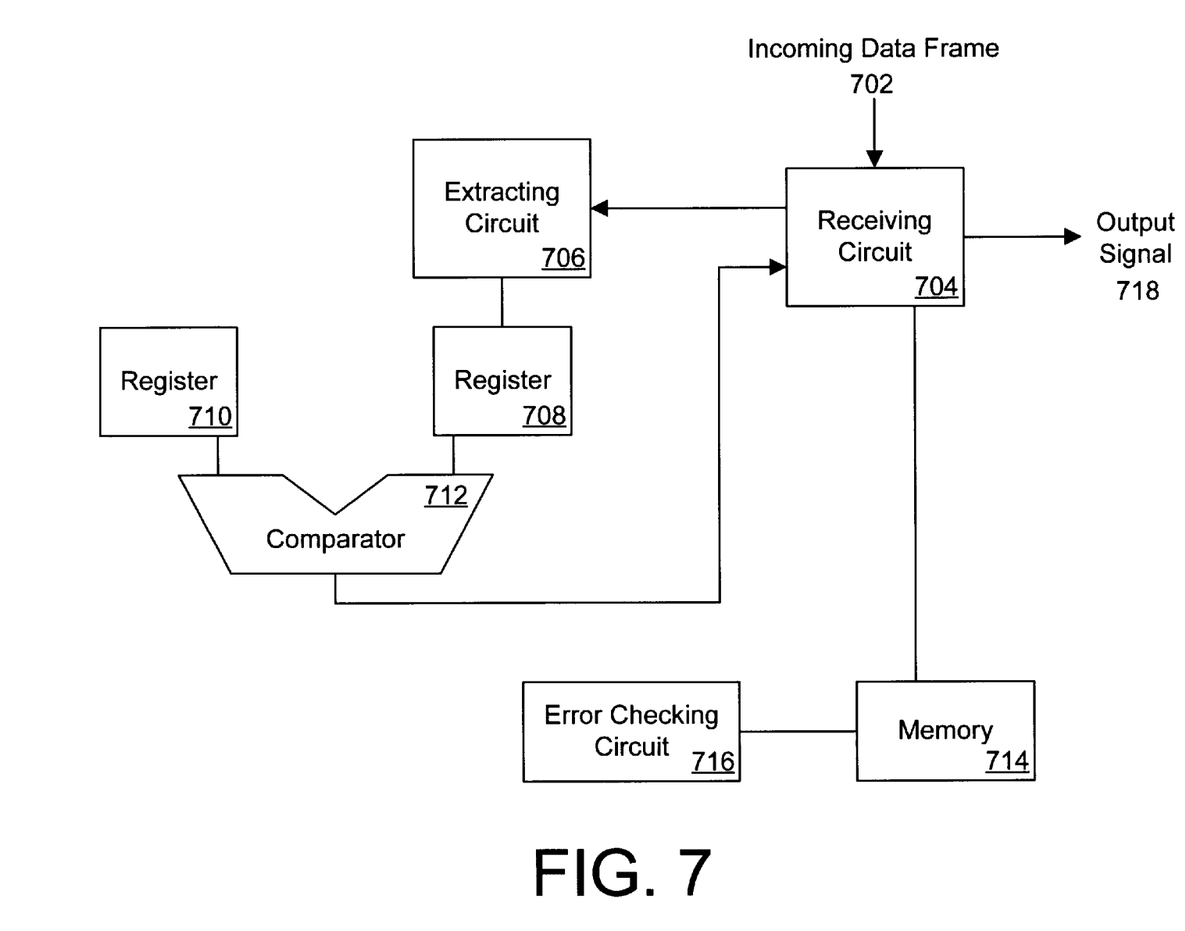
FIG. 7 illustrates a block diagram of the hardware used within one embodiment of the present invention to determine the type of data contained within the preamble field of the communication interface.

FIG. 7 illustrates a block diagram of the hardware utilized within circuit 700, which is one embodiment of the present invention to determine what type of data is contained within preamble field 336 of FIG. 3A. An incoming data frame 702 transmitted by cell station 100 of FIG. 1 is received by portable station 102 by receiving circuit 704. Extracting circuit 706 extracts a predetermined number of data bits from the beginning of preamble field 336 of FIG. 3B, located within sub-field 355, from incoming data frame 702. One present invention embodiment of extracting circuit 706 extracts 16 data bits from the beginning of preamble field 336.

Registers 708 and 710 of FIG. 7 are registers which each can store the same amount of data bits and are each coupled to comparator 712. One present invention embodiment of registers 708 and 710 are registers that each can store 16 bits of data. Register 708 is coupled to receive the extracted data bits from extracting circuit 706 and store them. Register 710 stores a predetermined data bit pattern. One present invention embodiment of register 710 stores the first 16 data bits of the standardized preamble data bit pattern of the personal handy phone system.

Comparator 712 of FIG. 7 compares the contents of register 708 to the contents of register 710. If the contents of registers 708 and 710 are identical, comparator 712 responds by transmitting a transfer control signal to receiving circuit 704. The transfer control signal is received by receiving circuit 704, causing it to transfer the received incoming data frame 702 to the hardware of portable station 102 of FIG. 1 as output signal 718. If the contents of registers 708 and 710 are not identical, comparator 712 responds by transmitting a storage control signal to receiving circuit 704. Receiving circuit 704 receives the storage control signal, causing it to transfer to memory unit 714 the data contained within preamble field 336 of FIG. 3A received within incoming data frame 702 only when extended common access data 350 has been detected.

The error checking circuit 716 of FIG. 7 determines if the data that is stored within memory unit 714 is free of any errors. One present invention embodiment of the error checking circuit 716 performs a cyclic redundancy check (CRC) on the data stored within memory unit 714.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method within a personal handy phone system for utilizing a preamble field of a communication interface to contain extended common access channel field information while optimizing power consumption, said method comprising the steps of:
   a) extracting a predetermined number of data bits from said preamble field of an incoming signal within said personal handy phone system;
   b) determining if said extracted data bits are identical to a data bit pattern which has the same amount of data bits as said extracted data bits;
   c) storing data contained within said preamble field within a memory device only if said extracted data bits are not identical to said data bit pattern; and
   d) determining if said stored data of said step c) is free of any errors only if said extracted data bits are not identical to said data bit pattern.

2. A method as described in claim 1 wherein said steps a) through d) are performed by a portable station of said personal handy phone system.

3. A method as described in claim 1 wherein said steps a) through d) are performed by a cell station of said personal handy phone system.

4. A method as described in claim 1 wherein said specific amount of data bits is equal to 2 data bits.

5. A method as described in claim 1 wherein said specific amount of data bits is equal to 16 data bits.

6. A method as described in claim 4 wherein said received signal includes a receiving communication slot within a time division multiple access capability with time division duplexing.

7. A method as described in claim 6 wherein said data bit test pattern is a portion of a standardized preamble of said personal handy phone system.

8. A method as described in claim 7 wherein said determining of said step d) is accomplished by performing a cyclic redundancy check on said stored data.

9. A method within a personal handy phone system for utilizing a preamble field of a communication interface to contain extended common access channel field information while optimizing power consumption, said method comprising the steps of:
   a) extracting a predetermined number of data bits from said preamble field of an incoming signal within said personal handy phone system;
   b) determining if said extracted data bits are identical to a data bit pattern which has the same amount of data bits as said extracted data bits;
   c) storing data contained within said preamble field within a memory device only if said extracted data bits are identical to said data bit pattern; and
   d) determining if said stored data of said step c) is free of any errors only if said extracted data bits are identical to said data bit pattern.

10. A method as described in claim 9 wherein said steps a) through d) are performed by a portable station of said personal handy phone system.

11. A method as described in claim 9 wherein said steps a) through d) are performed by a cell station of said personal handy phone system.

12. A method as described in claim 9 wherein said received signal includes a receiving communication slot within a time division multiple access capability with time division duplexing.

13. A method as described in claim 12 wherein said specific amount of data bits is equal to 2 data bits.

14. A method as described in claim 12 wherein said specific amount of data bits is equal to 16 data bits.

15. A method as described in claim 13 wherein said determining of said step d) is accomplished by performing a cyclic redundancy check on said stored data.

16. A circuit within a personal handy phone system for utilizing a preamble field of the communication interface to contain extended common access channel field information while optimizing power consumption, said circuit comprising:

a receiving circuit for receiving an incoming signal;

an extracting circuit for extracting a predetermined number of data bits from said preamble field of said incoming signal;

a first register coupled to receive and store said extracted data bits from said extracting circuit;

a second register to store a data bit pattern which has the same number of data bits as said predetermined number of data bits;

a comparator coupled to said first register and said second register to determine if said extracted data bits stored within said first register are identical to said data bit pattern stored within said second register;

said receiving circuit coupled to receive a control signal from said comparator;

a memory device coupled to said receiving circuit and coupled to said comparator to receive and store data contained within said preamble field provided said control signal indicates that said extracted data bits are not identical to said data bit pattern; and an error checking circuit for determining if said stored data is free of any errors provided said control signal indicates that said extracted data bits are not identical to said data bit pattern.

17. A circuit as described in claim 16 further comprising a portable station of said personal handy phone system wherein said circuit operates within said portable station.

18. A circuit as described in claim 16 further comprising a cell station of said personal handy phone system wherein said circuit operates within said cell station.

19. A circuit as described in claim 16 wherein said incoming signal includes a receiving communication slot within a time division multiple access capability with time division duplexing.

20. A circuit as described in claim 19 wherein said data bit pattern is a portion of a standardized preamble of said personal handy phone system.

21. A circuit as described in claim 19 wherein said error checking circuit performs a cyclic redundancy check on said stored data.

* * * * *

UNITED STATES PATENT AND TRADEMARK OFFICE
CERTIFICATE OF CORRECTION

PATENT NO. : 6,035,222
DATED : March 7, 2000
INVENTOR(S) : Yoshida, et. al.

It is certified that error appears in the above-identified patent and that said Letters Patent is hereby corrected as shown below:

Title page, item [75] inventors: "Phillipe Gaglione should read as followings: Philippe Gaglione.

Signed and Sealed this

Sixth Day of February, 2001

Attest:

Q. TODD DICKINSON

Attesting Officer

Director of Patents and Trademarks